(12) United States Patent
Wright

(10) Patent No.: US 6,445,702 B1
(45) Date of Patent: Sep. 3, 2002

(54) COMMON DOWNLINK FRAME FOR DIFFERING CODING RATES

(75) Inventor: David A. Wright, Solana Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/169,875

(22) Filed: Oct. 12, 1998

(51) Int. Cl.$^7$ ............................................... H04B 7/185
(52) U.S. Cl. ...................... 370/389; 714/774
(58) Field of Search ............................. 714/774, 784, 714/786, 755, 776, 781; 370/485, 321, 337, 347, 470, 342, 316, 220, 221; 375/140, 141, 134, 137

(56) References Cited

U.S. PATENT DOCUMENTS

| | | | | |
|---|---|---|---|---|
| 5,691,995 A | * | 11/1997 | Ikeda et al. | 371/43 |
| 5,875,199 A | * | 2/1999 | Luthi | 714/780 |
| 6,081,919 A | * | 6/2000 | Fujiwora et al. | 714/755 |
| 6,138,261 A | * | 10/2000 | Wilcoxson et al. | 714/355 |
| 6,157,642 A | * | 12/2000 | Sturza et al. | 370/389 |
| 2001/0003208 A1 | * | 6/2001 | Wan | 714/800 |
| 2001/0004761 A1 | * | 6/2001 | Zehavi | 714/784 |
| 2001/0025358 A1 | * | 9/2001 | Eidson et al. | 714/752 |

* cited by examiner

Primary Examiner—Douglas Olms
Assistant Examiner—Ken Vanderpuye
(74) Attorney, Agent, or Firm—Harness, Dickey & Pierce, P.L.C.

(57) ABSTRACT

A method is provided for organizing a plurality of cells into a fixed size frame for transmission in the downlink of a processing satellite (12) to at least one of a plurality of earth terminals (14), comprising the steps of: (a) determining an inner coding rate (22) for a first set of data cells (20); (b) forming a group of codewords by applying an outer code (24) to the first set of data cells (20), such that the number of codewords being proportional to the inner coding rate; (c) entering the group of codewords row wise (26) into an interleaving array; and (d) applying an inner code column wise (28) to the group of codewords, thereby forming a fixed size frame body (30). More specifically, the interleaving area includes a plurality of columns and a plurality of rows, such that the plurality of columns is equivalent to a block size of the outer code and the plurality of rows is equivalent to the number of codewords multiplied by the number of bits for each codeletter in the codewords and then divided by the inner coding rate.

21 Claims, 4 Drawing Sheets

US 6,445,702 B1

COMMON DOWNLINK FRAME FOR DIFFERING CODING RATES

BACKGROUND OF THE INVENTION

1. Field of the Invention

This invention relates generally to adaptive forward error correction coding in a data communication system and, more particularly, to a method of organizing data cells into a fixed size frame for transmission in the downlink from a processing satellite to a plurality of earth terminals.

2. Discussion of the Related Art

A downlink transmission from a spot beam processing satellite is typically a single access time division multiplexed (TDM) stream that is organized into discrete units known as frames. Generally, these frames encapsulate information which has been processed (at the satellite) to add redundancy for error correction at the earth terminal. In processing satellites, the forward error correction coding scheme typically applies an inner code and an outer code separated by an interleaver. To provide additional margin for weather effects and/or compensate for variations in gain across an antenna footprint, the rate used for error control coding may be varied from frame to frame.

To avoid complex processing in the transmission and reception of these frames, it is desirable that the size of the frame be invariant to changes in coding rates, otherwise more complex circuitry may be required to handle differently coded frames. In addition, variable size downlink frames present complications for the earth terminal electronics in deriving uplink synchronization from the downlink transmissions.

SUMMARY OF THE INVENTION

In accordance with the present invention, a method is provided for organizing a plurality of data cells into a fixed size frame for transmission in the downlink of a processing satellite, comprising the steps of: (a) determining an inner coding rate for a first set of data cells; (b) forming a group of codewords by applying an outer code to the first set of data cells, such that the number of codewords is proportional to the inner coding rate; (c) entering the group of codewords row wise into an interleaving array; and (d) applying an inner code column wise to the group of codewords, thereby forming a fixed size frame body.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

While the invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Figure 1:
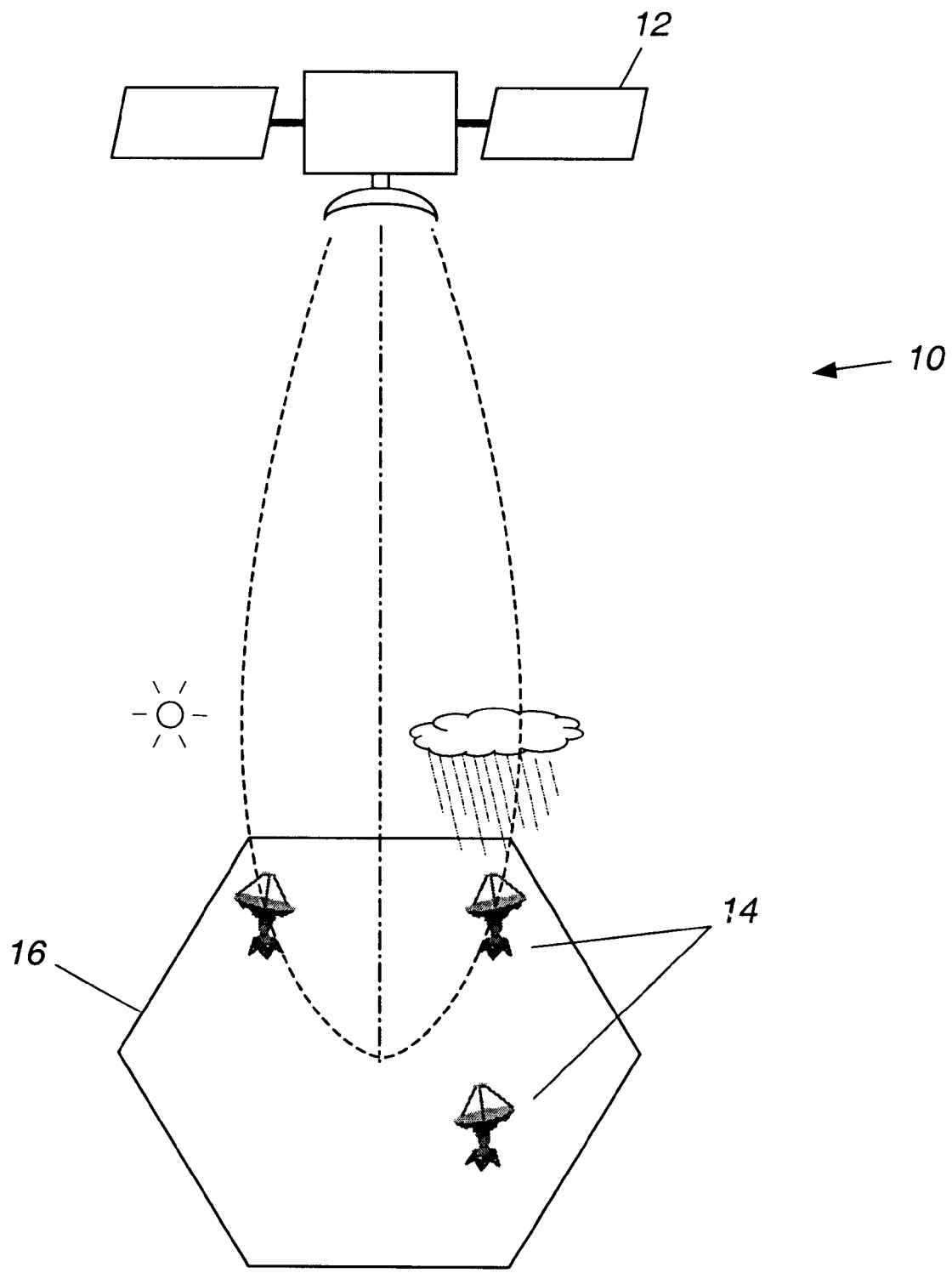
FIG. 1 is a diagram illustrating a typical satellite data communication system in accordance with the present invention.

A typical satellite communication system 10 is depicted in FIG. 1. Communication system 10 includes a spot beam processing satellite 12 which completes a virtual circuit connection between any two of a plurality of earth terminals 14. Generally, information is uplinked from a earth terminal 14 to the satellite 12 which in turn downlinks the information 14 to a receiving earth terminal 14. For an uplink transmission, the satellite frequency domain is divided into narrow frequency channels such that each channel is used in a time-division multiple access (TDMA) mode, known to those skilled in the art. At the satellite 12, uplink transmissions are demodulated, decoded and unpacked to recover the self addressed, fixed length data cells. These data cells are switched to queues for the appropriate downlink and coding rate, and then downlinked to the appropriate earth terminal 14. As will also be apparent to one skilled in the art, a single access time division multiplexed (TDM) stream is typically used to downlink information to receiving earth terminal 14.

Downlink transmissions from processing satellite 12 often use various forward error correction coding schemes for error control. Generally, coding schemes fall into two main categories: block codes and convolutional codes. Decoding schemes for block codes generally use algebraic procedures, based on properties of the code structure, and involve solving sets of algebraic equations; Reed-Solomon codes are commonly used block codes. For convolutional codes, the most common decoding scheme is the maximal-likelihood Viterbi algorithm; basically a dynamic programming technique. Concatenated coding is one well known technique for combining the error correcting benefits of block codes with the benefits of convolutional codes.

Furthermore, processing satellite 12 typically operates at frequencies in the Ka band (e.g., on the order of 20 gigahertz). At these frequencies, rain produces a significant amount of attenuation in the downlink transmissions. Therefore, it is necessary to provide substantial link margin to permit transmission during unfavorable weather conditions. Furthermore, an antenna coverage pattern 16 for such spot beam satellites often exhibits substantial variation in gain across its antenna footprint. In particular, the amount of gain drops moving from the center to the outer limit of an antenna beam.

To provide additional margin for weather effects and/or compensate for variations in gain across an antenna footprint, the rate used for error control coding may be varied from frame to frame. This is commonly referred to as adaptive forward error control. For example, one frame may be coded with a high coding rate ("light" coding) for downlink transmissions to earth terminals located at mid beam and/or under clear sky; whereas other frames use a lower coding rate ("heavy" coding) for downlinking to earth terminals located near the outer limit of an antenna beam and/or experiencing rain. As a result, a frame containing "lightly" coded information has less redundancy than a frame containing "heavy" coded information. In order to implement adaptive error coding, satellite 12 includes means for determining which coding rate is to be used in forming the next downlink frame. Such determination is based on parameters supplied to the satellite from other portions of the system and is not explicated herein.

Figure 2:
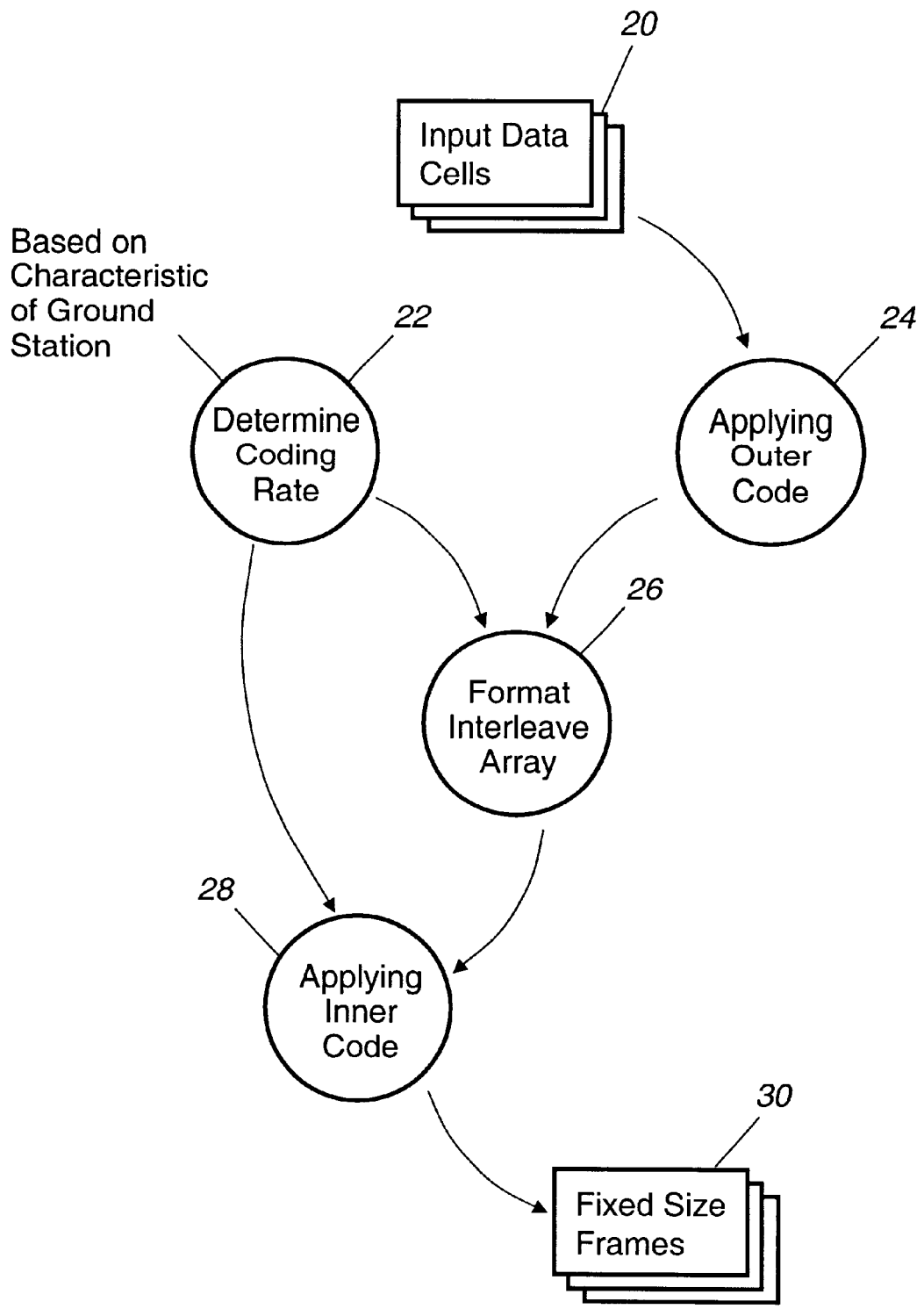
FIG. 2 is a diagram illustrating the downlinking method of the present invention.

To avoid complex processing in the transmission of downlink frames, it is desirable that the size of these frames be invariant to changes in coding rates. In accordance with the present invention, communication system 10 employs a method of organizing a plurality of data cells into a fixed size frame for transmission in the downlink of a processing satellite. A diagram illustrating the method of the present invention is shown as FIG. 2.

First, an inner coding rate is determined 22 for the next frame to be formed. A group of codewords are then formed by applying 24 the outer code to a set of data cells 20, such that the number of codewords formed is based on the inner coding rate. The information content of each such codeword includes a number of data cells (sufficient to fill the codeword) drawn from a buffer which queues data cells according to their selected coding rate.

A rectangular array is used for interleaving between the codes. To format the array 26, the group of codewords are placed row wise into the interleaving array, partially filling it. Next, the contents of the array are expanded by applying the inner code 28 to the columns of this array. At the completion of the inner coding, a fixed size downlink frame 30 is formed, regardless of the coding rate.

More specifically, concatenated coding in the present invention applies an "outer" code (e.g., a block code) and an "inner" code (e.g., convolutional code) to each downlink frame. Each frame includes a body containing payload information as well as a header and/or trailer for use in overhead transmission functions. It is this payload information that is subject to error correction coding. A (N, K, v) Reed-Solomon ("outer") code is applied to the payload information received from the satellite's ATM-based switching system. Since ATM cells are byte organized, the Reed-Solomon code is also byte organized. Therefore, payload information is preferably received in (K=) 212 byte data cells (which corresponds to four ATM cells) and then translated into (N=) 236 byte Reed-Solomon codewords, where each codelefter of the code is a binary (v=) 8-tuple.

Figure 3:
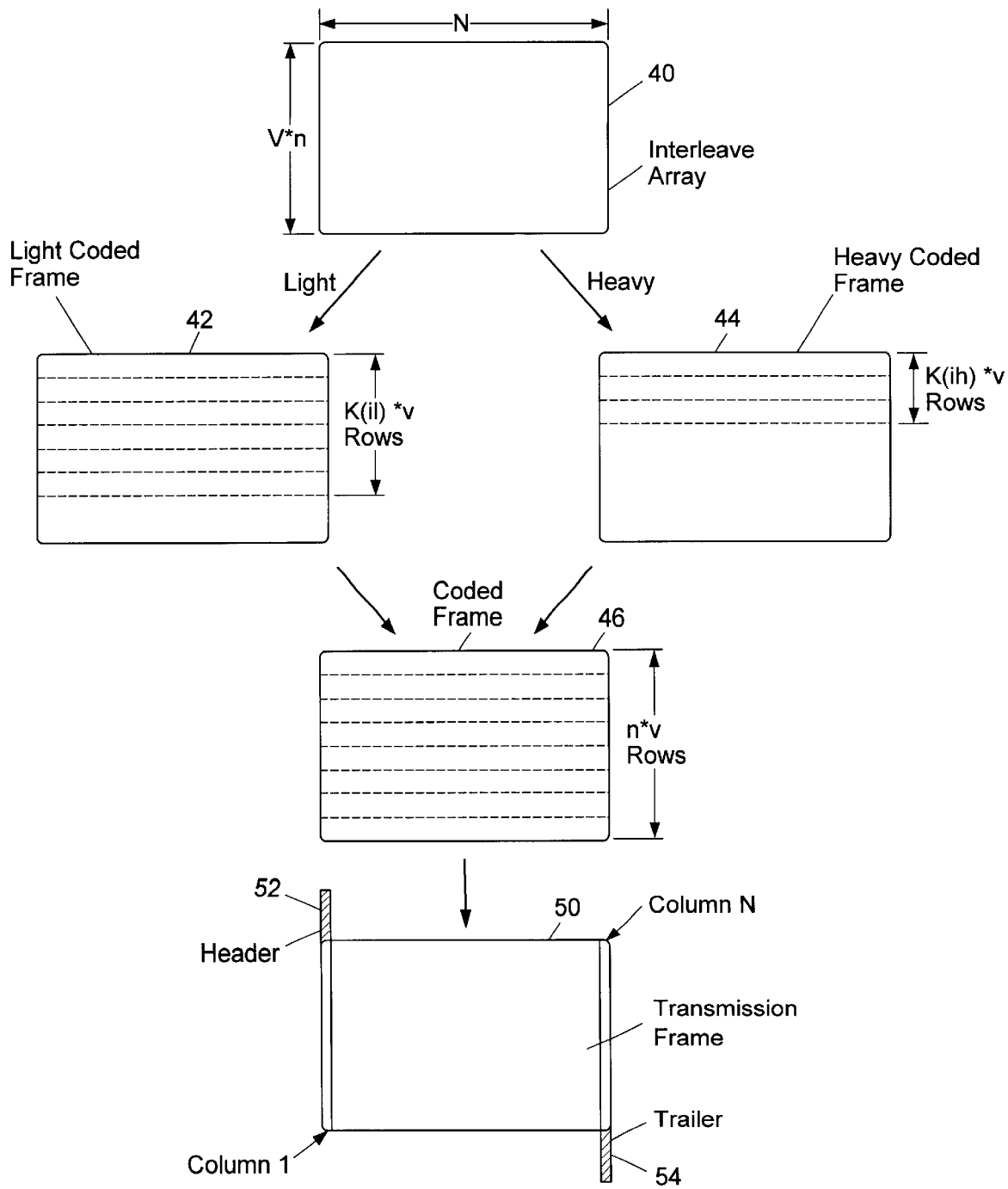
FIG. 3 is detailed dataflow diagram showing the downlinking method of the present invention.

After the coding rate for a particular frame has been determined, rectangular interleaving between the outer and inner code is used to generate each downlink frame. Referring to FIG. 3, an interleave area is defined as a fixed size rectangular array 40 (having N columns and n*v rows) for storing N*n*v bits of payload information. It should be noted that the number of columns (N) in array 40 corresponds to a multiple of the block size for the outer code (e.g., N=236).

Based on the inner coding rate, the rectangular array is formatted with Reed-Solomon codewords. For a convolutional code having a coding rate of k(i)/n, k(i) codewords are entered into array 40, where k(i) and n are integers with k(i)<=n. Since the Reed-Solomon codewords are based on codeletters of "v" bits (e.g. preferably 8 bits), these codewords occupy k(i)*v rows of the array (i.e., each outer codeword occupies v bits of a column). Next, the contents of the array are presented column-wise to the inner encoder which expands the size of each column to n*v bits. In this way, the resultant array has a fixed size of N*n*v bits, regardless of the inner code rate.

For instance, to generate a light coded frame, k(il) codewords (e.g., 6 codewords) are entered into an array 42. The codewords are indicated by dotted lines in array 42. The contents of array 42 are then expanded by applying an inner code rate of k(il)/n (e.g., 6/8) to each column of array 42. In this way, a light coded frame 46 Is comprised of 236*6**(6/8)*8 or 15,104 bits of payload information. A similar approach is used to form a heavy coded frame, except that to begin the process only k(ih) codewords (e.g., 3 codewords) are entered into an array 44. Again, the codewords are indicated by dotted lines in array 44. Although fewer outer codewords are initially entered into the interleaver, frame 46 is completely filled after the heavy inner code rate of k(ih)/n (e.g., 3/8) is applied to each column. Accordingly, heavy coded frame 46 is also comprised of 236*3**(8/3)*8 or 15,104 bits of payload information.

Therefore, regardless of the inner coding rate, a fixed size array 46 having N*n*v bits of payload information is formed at the completion of the concatenated coding process. In this case, the dotted lines in array 64 are indicative of the coded bits of payload information. Array 46 is commonly referred to as the body of a frame. In the preceding discussion, reference has only been made to either light or heavy coding. It is envisioned that the present invention can accept many distinct coding rates, so long as n is the same and the inner code rate is held constant within a given frame.

To complete a downlink transmission frame 50, some overhead information is appended to the body. Overhead information is of a fixed length in the form of a header 52 (prepended at column 1) and a trailer 54 (postpended at column N). The header 52 contains a fixed synch pattern which is used to delineate the frame within the TDM stream and an indicator as to the coding rate associated with the frame. It should be noted that the synch pattern also serves to eliminate the four way ambiguity that arises with QPSK TDM streams. Other information (e.g., frame number) may also be included in frame header 52. The trailer 54 may contain the "tailoff" bits from the convolutional encoding process and is sized to accommodate the longest tailoff required for the various inner coding rates to be accommodated with a fixed length frame. As a result, the overhead structure is common to each frame and the frame length is fixed for all coding rates.

Figure 4:
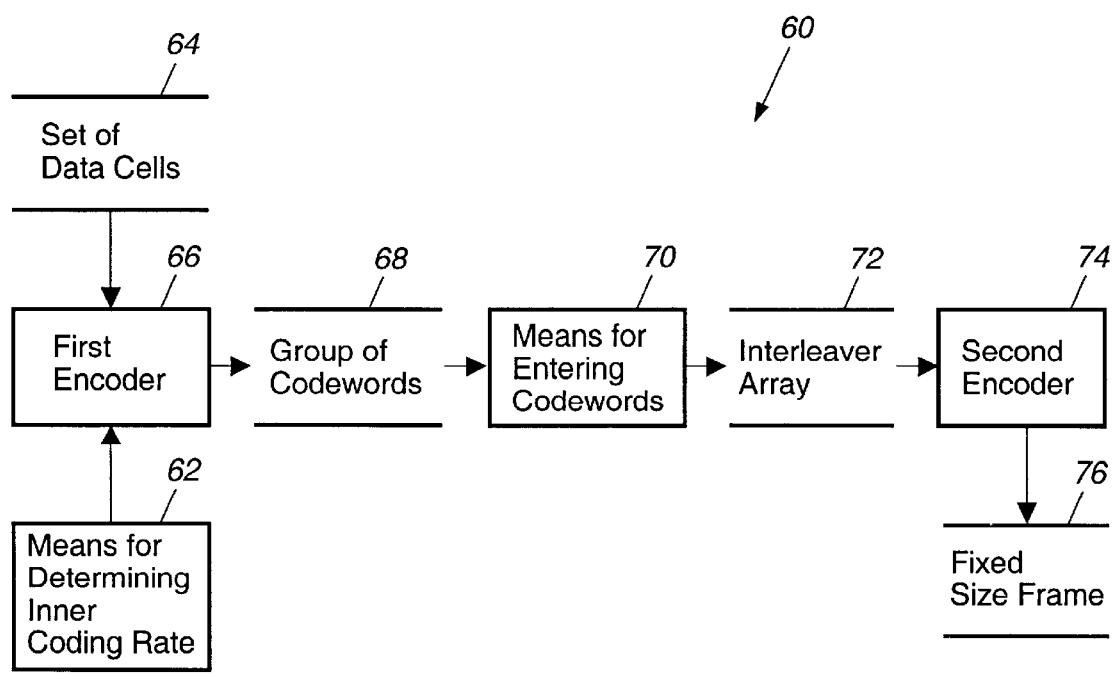
FIG. 4 is a block diagram depicting a data communication system for transmitting a fixed size frame in accordance with the present invention.

FIG. 4 illustrates a data communication system 60 for transmitting a fixed size frame in accordance with the above-described methodology. The fixed size frame may be transmitted via a downlink from a processing satellite to at least one earth terminal. The data communication system 60 includes a means for determining an inner coding rate 62 for downlinking a set of data cells 64 to a first earth terminal, where the inner coding rate is based on a characteristic of the first earth terminal; a first encoder 66 for forming a group of codewords 68 by applying an outer code to the set of data cells 64, such that the number of codewords is proportional to the inner coding rate; a means for entering the group of codewords 70 row wise into an interleaver array 72; and a second encoder 74 for applying an inner code column wise to the group of codewords, thereby forming a fixed size frame 76.

It should be appreciated that the downlinking method of the present invention provides commonality of length and structure for each frame, and thus simplifies the electronics required to interleave and form frames at the satellite. Simplified electronics can also then be used to delineate the frames from the TDM stream, expunge quadrant ambiguity, and control variable rate decoding at the earth terminal. Due to the high regularity associated with the frames, this downlinking approach also increases reliability of downlink synchronization and simplifies the uplink synchronization procedure for earth terminals.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A method of organizing a plurality of data cells into a fixed size frame for transmission in the downlink of a processing satellite to at least one of a plurality of earth terminals in a satellite communication system, comprising the steps of:
   determining a coding rate for a first set of data cells, said coding rate associated with a first code;
   applying a second code to said set of data cells to form a group of coded blocks, such that the number of coded blocks being based on said coding rate;
   formatting an interleaver area with said group of coded blocks; and
   applying said first code to said group of coded blocks using said coding rate, thereby forming a fixed size frame.

2. The method of claim 1 wherein the step of applying a first code further comprises utilizing a convolutional code as said first code.

3. The method of claim 1 wherein the step of applying a second code further comprises utilizing a Reed-Solomon code as said second code.

4. The method of claim 1 further comprising the step of appending frame overhead data to said fixed size frame prior to transmission in the downlink of the processing satellite, said frame overhead data including an indication of said coding rate.

5. The method of claim 1 comprising addressing each data cell of said first set of data cells independently to one or more of the plurality of earth terminals.

6. The method of claim 1 further comprising transmitting said fixed size frame to a first earth terminal and basing said coding rate on a characteristic of said first earth terminal.

7. The method of claim 6 further comprising selecting said characteristic of said first earth terminal from at least one of the signal propagation associated with said first earth terminal and the location of said first earth terminal within the antenna coverage of the satellite.

8. The method of claim 1 wherein the step of formatting an interleaver area further comprises providing a rectangular array having a plurality of columns and a plurality of rows, such that said plurality of columns being equivalent to a block size of said second code and said plurality of rows being equivalent to the number of coded blocks multiplied by the number of bits for each codeletter and then divided by said coding rate.

9. The method of claim 8 wherein the step of applying said first code further comprises expanding said coded blocks in each of said plurality of columns of said rectangular array.

10. The method of claim 1 further comprising the steps of:
    transmitting said fixed size frame to a first earth terminal;
    determining a second coding rate for a second set of data cells;
    applying said second code to said second set of data cells to form a second group of coded blocks, such that the number of coded blocks being based on said second coding rate;
    formatting said interleaver area with said second group of coded blocks;
    applying said first code to said second group of coded blocks using said second coding rate, thereby forming a second fixed size frame; and
    transmitting said second fixed size frame to a second earth terminal.

11. A method of organizing a plurality of data cells into a fixed size frame for transmission in the downlink of a processing satellite to at least one of a plurality of earth terminals, comprising the steps of:
    determining an inner coding rate for a first set of data cells;
    forming a group of codewords by applying an outer code to said set of data cells, such that the said group of codewords being proportional to said inner coding rate;
    entering said group of codewords row wise into an interleaving array; and
    applying an inner code column wise to said group of codewords, thereby forming a fixed size frame.

12. The method of claim 11 further comprising the step of appending frame overhead data to said fixed size frame body prior to transmission in the downlink of the processing satellite, said frame overhead data including an indication of said inner coding rate.

13. The method of claim 11 comprising addressing each cell of said first set of data cells independently to one or more of the plurality of earth terminals.

14. The method of claim 11 wherein the step of forming a group of codewords further comprises utilizing a Reed-Solomon code as said outer code.

15. The method of claim 11 wherein the step of applying an inner code further comprises utilizing a convolutional code as said inner code.

16. The method of claim 11 further comprising transmitting said fixed size frame to a first earth terminal and basing said inner coding rate on a characteristic of said first earth terminal.

17. The method of claim 16 further comprising selecting said characteristic of said first earth terminal from at least one of the signal propagation associated with said first earth terminal and the location of said first earth terminal within the antenna coverage of the satellite.

18. The method of claim 11 wherein the step of formatting an interleaver array further comprises providing a rectangular array having a plurality of columns and a plurality of rows, such that said plurality of columns being equivalent to a block size of said outer code, and said plurality of rows being equivalent to the number of codewords multiplied by the number of bits for each codeletter in said codewords and then divided by said inner coding rate.

19. The method of claim 11 further comprising the steps of:
    transmitting said fixed size body to a first earth terminal;
    determining a second coding rate for a second set of data cells;
    applying said outer code to said second set of data cells to form a second group of codewords, such that the second group of codewords being based on said second coding rate;
    formatting said interleaver area with said second group of codewords;
    applying said inner code to said second group of codewords using said second coding rate, thereby forming a second fixed size frame; and
    transmitting said second fixed size frame to a second earth terminal.

20. A data communication system for transmitting a fixed size frame in a downlink from a processing satellite to at least one of a plurality of earth terminals, comprising:

a means for determining an inner coding rate for downlinking a set of data cells to a first earth terminal, said inner coding rate being based on a characteristic of said first earth terminal;

a first encoder for forming a group of codewords by applying an outer code to said set of data cells, such that the group of codewords being proportional to said inner coding rate;

a means for entering said group of codewords row wise into an interleaver array; and a second encoder for applying an inner code column wise to said group of codewords, thereby forming a fixed size frame.

21. The data communication system of claim 20 further comprises a means for appending frame overhead data to said fixed size frame prior to transmission in the downlink of the processing satellite, said frame overhead data including an indication of said inner coding rate.

* * * * *